United States Patent [19]
d'Auria Luigi

[11] 4,378,490
[45] Mar. 29, 1983

[54] OPTICAL ATTENUATOR PROVIDING CONTROLLED ATTENUATION

[75] Inventor: d'Auria Luigi, Paris, France

[73] Assignee: Thomson-CSF, Paris, France

[21] Appl. No.: 208,001

[22] Filed: Nov. 18, 1980

[30] Foreign Application Priority Data

Nov. 21, 1979 [FR] France .................................. 79 28693

[51] Int. Cl.$^3$ ................................................ G01V 1/20
[52] U.S. Cl. ...................................... 250/201; 250/205; 350/384
[58] Field of Search ........................ 250/201, 204, 205; 350/384, 387

[56] References Cited

U.S. PATENT DOCUMENTS

| 3,962,576 | 6/1976 | Kuhl et al. | 250/201 |
| 4,071,751 | 1/1978 | Waksburg | 250/201 |
| 4,306,142 | 12/1981 | Watanabe et al. | 350/384 |

*Primary Examiner*—David C. Nelms
*Attorney, Agent, or Firm*—Oblon, Fisher, Spivak, McClelland & Maier

[57] ABSTRACT

The real attenuation produced by the optical attenuator is determined by means of photodetectors which carry out continuous measurement of the intensity of an auxiliary beam before and after it passes through the attenuator element. Signals which are emitted by the photodetectors and are proportional to the intensity received are transmitted to an electronic processing system which computes and displays the attenuation in decibels.

16 Claims, 7 Drawing Figures

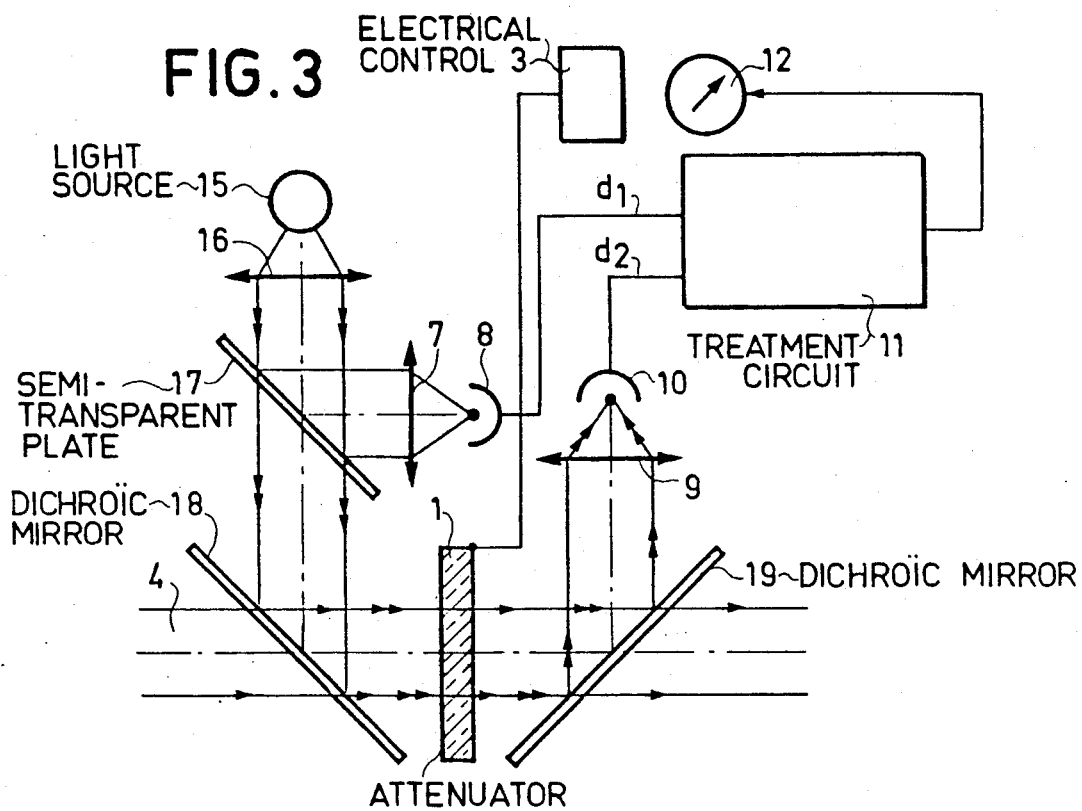
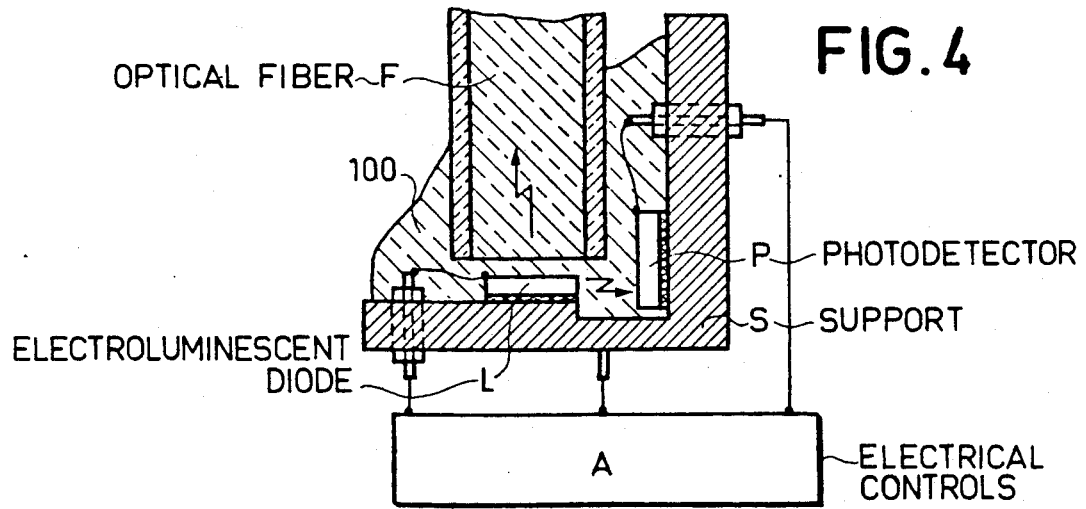

OPTICAL ATTENUATOR PROVIDING CONTROLLED ATTENUATION

BACKGROUND OF THE INVENTION

1. Field of the Invention

This invention relates to optical attenuators which may be either adjustable or controlled by a modulating signal in order to obtain accurate attenuation of a beam of light rays and is more particularly directed to an optical attenuator which provides controlled attenuation.

2. Description of Prior Art

Fixed or variable optical attenuators have already been proposed and are designed on the basis of many different techniques such as absorption, diffusion, polarization and so on, depending on their intended use. For example, polychromatic beams are attenuated in the field of image projection whereas monochromatic radiations are transmitted in the field of optical fiber transmission.

One example of a wide-band attenuator which can be employed as a light modulator for the projection of images, for example, is described by M. Hareng in "Revue Technique Thomson-CSF 3 No. 3, 473 (1971)" and consists of a liquid-crystal device having electrically controlled attenuation.

A desirable objective in the field of optical fiber transmission consists in subjecting a light signal delivered by an input fiber to attenuation by a perfectly known and variable quantity, the signal being collected by an output fiber after attenuation. Attenuation values as high as 50 db may thus be obtained. At high levels of this order, attenuators must achieve a very high quality standard in order to obtain the requisite degree of accuracy. Attenuators of this type do in fact exist: for example, in "Nec Research and Development, 50, 17 (1978)", K. Doi et Al describe attenuators obtained from plates providing variable optical density and mechanical insertion in either discrete or continuous values.

Another attenuation technique is described in French Pat. No. 77 39 196 filed on Dec. 26th, 1977 and relating to a "Variable optical attenuator for optical fiber transmission". In this case, attenuation is obtained from a plate cut from material having electrical birefringence controlled by the voltage applied between two electrodes.

In these examples, displayed values rely on calibration prior to use and do not account for possible variations in the attenuation value during operation. These variations may arise in the first case from mechanical displacements and in the second case from variations in electrical control or in real attenuation of the plates as a function of temperature, for example.

In order to limit the potential danger of variation of the attenuator, it is necessary to improve the quality of materials, to achieve higher accuracy in assembly and so on, with the result that the cost price of the attenuator is also increased.

The aim of the invention is to overcome this disadvantage by proposing an attenuator having a value of attenuation which is not dependent on preliminary calibration.

SUMMARY OF THE INVENTION

The invention is more specifically directed to an optical attenuator having controlled attenuation and comprising an attenuator element interposed on the path of a so-called principal light beam, and a control input for adjusting the attenuation. The distinctive feature of the invention lies in the fact that the attenuation produced by the attenuator element is continuously detected by an auxiliary optical system which is optically coupled to the attenuator element and that an electronic processing system receives the signals delivered by the auxiliary optical system in order to generate an attenuation control signal.

With this objective, provision is made for an auxiliary opitcal system which makes it possible both before and after attenuation to carry out continuous measurement of the intensity of a beam which passes through the attenuator element. A comparison of the two values of intensity gives the real attenuation of the attenuator. In practice, the intensities are recorded by photodetectors and electrical signals which are proportional to these intensities are transmitted by said photodetectors to an electronic processing system which calculates and directly displays the value of attenuation in decibels.

This technique applies both in the case of a fixed attenuator which is intended to ensure freedom from variation either with time or temperature and in the case of a variable attenuator which is intended to ensure a predetermined attenuation.

The components required for the construction of the auxiliary optical system and of the electronic processing system are now in widespread use and entail low capital expenditure. In consequence, the attenuator which is proposed offers high accuracy and fidelity at much lower cost than a conventional apparatus having the same design performances but requiring preliminary calibration.

The proposed device does not involve any particular requirement in regard to stability of characteristics of the attenuator element, in regard to linearity of attenuation with a mechanical displacement or a control voltage and in regard to sensitivity to any possible mechanical movements.

BRIEF DESCRIPTION OF THE DRAWINGS

The different features of the invention will be more apparent to those skilled in the art upon consideration of the following description and accompanying drawings, wherein:

FIG. 3 illustrates a second exemplified embodiment of the device according to the invention;

FIG. 4 illustrates a constructional detail of the device shown in FIG. 3;

DETAILED DESCRIPTION OF THE PREFERRED EMBODIMENTS

Figure 1:
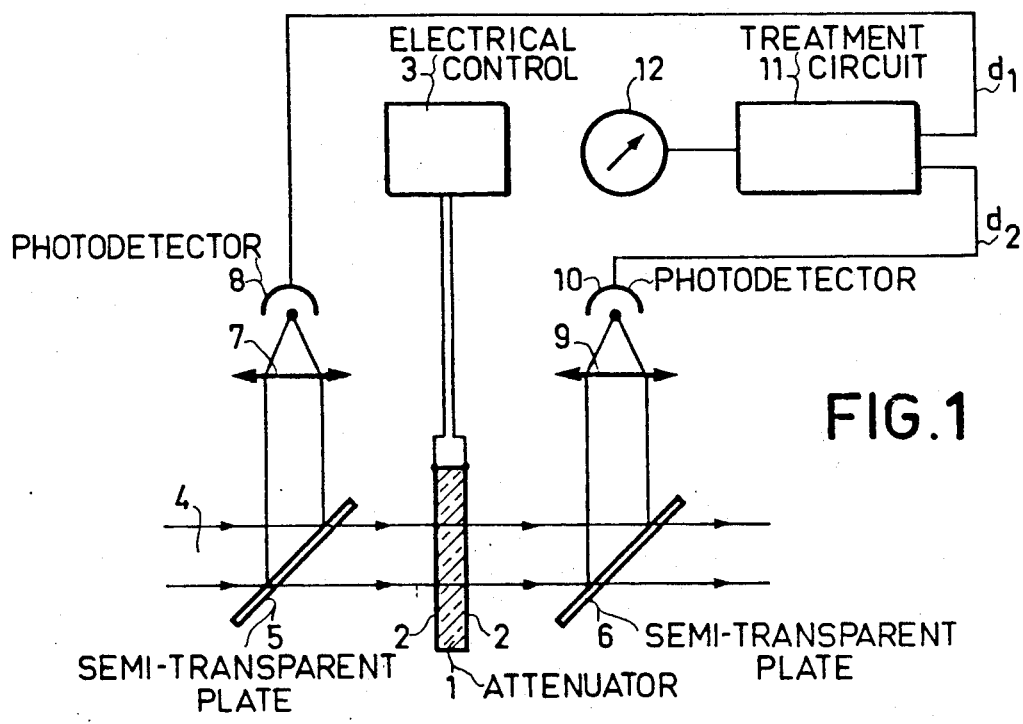
FIG. 1 illustrates a first exemplified embodiment of the device according to the invention.

In the different figures referred-to in the foregoing, the same reference numerals designate the same elements.

The following description relates to the case of an adjustable optical attenuator with electrical control but it will be apparent that this case is not given in any limiting sense.

The attenuator element may be constituted by one or a number of attenuator plates for absorption, diffusion, polarization or any other method of attenuation.

There is shown in FIG. 1 an optical attenuator providing controlled attenuation in accordance with the invention.

By way of non-limiting example, the attenuator element 1 in this case is a liquid-crystal cell provided with two electrodes 2 connected to an electrical control device 3. Said element is interposed on the path of the so-called principal beam 4 to be attenuated. Two semi-transparent plates 5 and 6 are placed on the path of said beam 4 on each side of the attenuator element 1. A known fraction of the beam energy is collected by the plate 5 before passing through the attenuator 1, transmitted by said plate to a lens 7 and then focused by this latter on a photodetector 8. The plate 6 collects a fraction of the beam energy after attenuation and transmits said energy through the lens 9 to the photodetector 10. The photodetectors 8 and 10 generate two electrical signals $d_1$ and $d_2$ which are proportional to the incident and emergent intensities of the beam.

Said signals $d_1$ and $d_2$ are applied to an electronic processing system 11. The system then calculates the ratio of incident and emergent intensities and calculates the logarithm of said ratio in order to produce an expression of the real attenuation in decibels. This numerical expression is indicated by means of the display device 12.

It is only necessary to produce action on the electrical control device 3 of the attenuator element in order to obtain the desired attenuation value by means of the display control.

Figure 2:
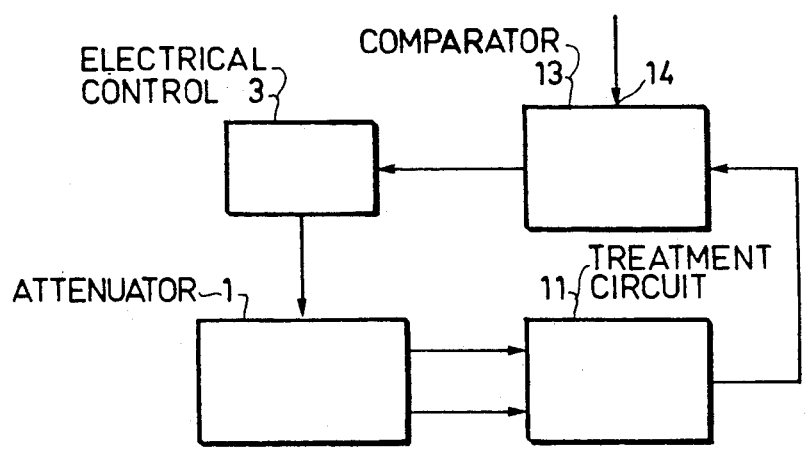
FIG. 2 illustrates an alternative embodiment of the device according to the invention.

Without departing from the field of the invention, this reference value can be maintained automatically by means of a control system as shown diagrammatically in FIG. 2. This is particularly advantageous when the reference value appears in the form of a numerical data carrier signal which characterizes said attenuation or the amplitude of which characterizes an incident modulation.

The attenuator 1 transmits to the electronic processing system 11 the two signals which are proportional to the intensities of the beam before and after attenuation. This system delivers an attenuation measurement signal which is applied to one of the inputs of a comparator 13, the reference value being applied to the other input 14. The comparator then transmits the attenuation adjustment order to the control device 3 of the attenuator element. The control device 3 applies the necessary voltage to the electrodes of the attenuator element.

The attenuator as has just been described and as illustrated in FIG. 1 has the advantage of being simple to construct but suffers from the disadvantage of entailing the need for a collection of intensity from the principal beam. This is attended by two consequences, both of which affect the range of utilization of the attenuator. The first consequence lies in the fact that this energy collection introduces an additional attenuation which may prove objectionable if it is desired to have a low attenuation for the principal beam. The second consequence lies in the fact that, if the desired attenuation of the principal beam exceeds 30 to 40 dB, the fraction of intensity collected for measurement on the attenuated beam is small and this measurement accordingly becomes very difficult, thus requiring sophisticated and therefore costly means, which is contrary to the spirit of the invention.

In order to overcome this disadvantage which finally sets limits on the degree of attenuation, recourse is had to an auxiliary beam which passes through the attenuator element at the same time as the principal beam and on which measurements of intensity are performed both before and after attenuation.

This leads to a number of possible configurations.

One of these configurations is illustrated in FIG. 3. Its main feature lies in the fact that the auxiliary beam is superimposed on the principal beam before this latter passes through the attenuator element. In this example, the principal beam is parallel and monochromatic of wavelength $\lambda_0$.

FIG. 3 shows the attenuator element 1 equipped with its control device 3 which is inserted on the path of the principal beam 4.

The auxiliary beam emerges from a light source $S(\lambda_1)$ designated by the reference numeral 15. By way of example, said source consists of an electroluminescent diode which emits monochromatic radiation of wavelength $\lambda_1$ which is different from $\lambda_0$.

All or part of the radiation from the source $S(\lambda)_1$ is collected on a lens 16 so as to form a parallel light beam which may, for example, have the same cross-sectional area as the principal beam. One component consisting of part of said beam is collected by means of a semi-transparent plate 17 which has a known coefficient of collection. The component thus collected is transmitted by the lens 7 to the photodetector 8 which delivers an electrical reference signal $d_1$ which is proportional to the intensity of the auxiliary beam prior to attenuation.

The other component of said auxiliary beam is made collinear with the main beam by means of a dichroic mirror 18 which entirely transmits the radiation of wavelength $\lambda_0$ and entirely reflects the radiation of wavelength $\lambda_1$. The difference between the wavelengths $\lambda_0$ and $\lambda_1$ may be only about one hundred angströms.

Said auxiliary beam then passes through the attenuator element 1 and has the same cross-sectional area as the main beam, which is an advantage since the attenuation may not be uniform over the entire surface of this element. The auxiliary beam is then separated from the principal beam by a second dichroic mirror 19, transmitted to the lens 9, then focused by said lens on the second photodetector 10. Said photodetector 10 generates an electrical signal $d_2$ which is proportional to the intensity of the auxiliary beam after attenuation.

As in the previous configuration, said signals $d_1$ and $d_2$ are processed in the electronic system 11 which delivers to the display device 12 the value in decibels of the attenuation experienced by the auxiliary beam, this value being the same as that of the attenuation experienced by the principal beam. If the attenuation produced by the attenuator element is different in respect of the wavelengths $\lambda_0$ and $\lambda_1$, a corrective term may accordingly be introduced into the calculation in order to restore the attenuation measured in respect of the wavelength $\lambda_1$ to the value which it would have in respect of the wavelength $\lambda_0$. It is assumed that said corrective term is independent of the attenuation within the range of utilization.

This device permits automatic control as described earlier.

This configuration lends itself to many alternative embodiments, two of which are hereinafter described by way of example.

The first alternative embodiment is concerned with the auxiliary optical-path segment constituted by the source 15, the lens 16, the semitransparent plate 17, the lens 7 and the photodetector 8. This segment can be replaced by an integrated device, for example of the type described in French Pat. No. 74 23 408 filed on July 5th, 1974 and entitled "Device for controlling an electroluminescent diode and optical communication system comprising a device of this type". As shown in FIG. 4, this device supplies an optical fiber F with radiation produced by an electroluminescent diode L, the radiation intensity being measured by means of the photodetector P. These elements are rigidly fixed to a support S by means of bonding material 100 and controlled electrically by the supply unit A.

The second alternative embodiment is concerned with the dichroic mirror 18 shown in FIG. 3. If it is considered that the desired attenuation of the principal beam permits the loss of a known fraction of the intensity of said beam and if the loss of another known fraction of the auxiliary beam is also considered acceptable, then the dichroic mirror 18 mentioned above may accordingly be replaced by a semitransparent plate which is lower in cost price.

Figure 5:
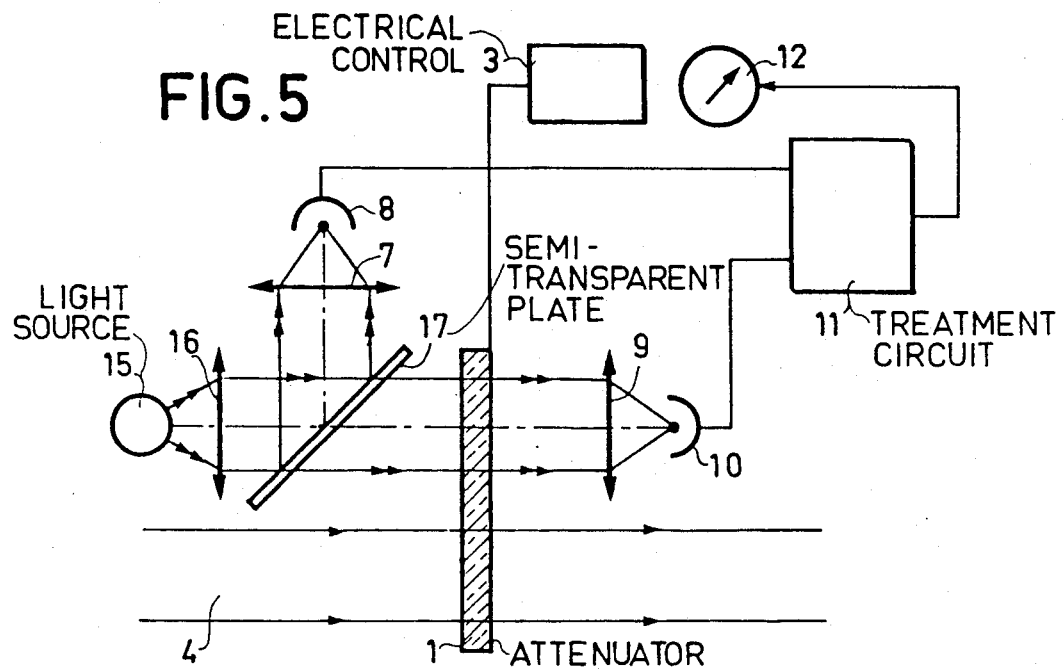
FIG. 5 illustrates a third exemplified embodiment of the device according to the invention.

Another configuration of the device according to the invention is shown in FIG. 5. In this example, the auxiliary light beam traverses the attenuator element 1 next to the principal beam 4 and never coincides with this latter. This configuration is possible only if the entire surface of the attenuator element is sufficiently uniform but is applicable to a beam which is not necessarily monochromatic; if said beam is monochromatic, the wavelength of the auxiliary beam can be the same as the wavelength of the principal beam.

As in the previous configuration, the auxiliary source 15 emits radiation towards the lens 16 in order to form a parallel beam. One component of said beam is collected by the semitransparent plate and transmitted by the lens 7 to the photodetector 8.

The other beam component passes through the attenuator element 1 in a region which is adjacent to the region traversed by the principal beam and is collected on the lens 9, then focused on the second photodetector 10 by said lens.

These two signals delivered by the photodetectors 8 and 10 are processed as in the preceding embodiments by the electronic system 11 which delivers the value of attenuation in decibels to the display device 12.

As in the preceding embodiments, this device can be controlled automatically.

In this case also, the frist auxiliary opticalpath segment can be replaced by an integrated element.

Figure 6:
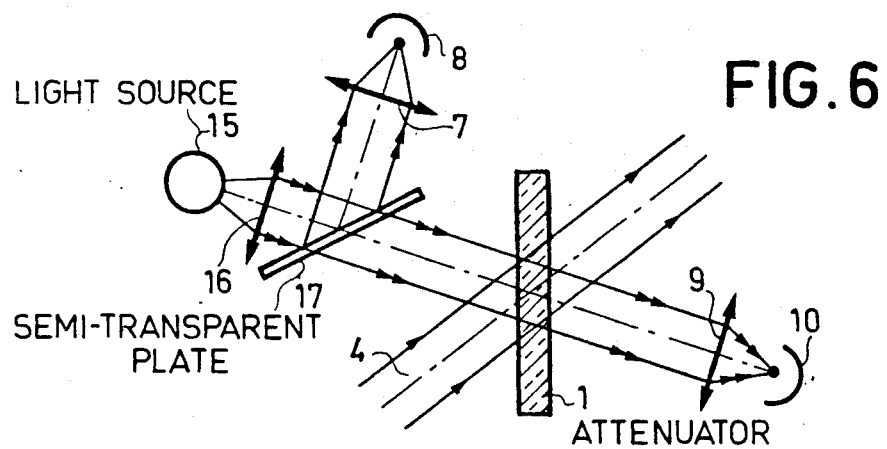
FIG. 6 illustrates a fourth exemplified embodiment of the device according to the invention.

Another configuration is illustrated in FIG. 6. The only difference between this latter and the preceding configuration lies in the fact that the auxiliary optical path passes through the attenuator element at an angle of incidence which is different from the angle of incidence of the principal beam. Crossover of the beams can take place in the same zone and there is no interference between the two beams.

This configuration combines the advantages of the two others, that is, traversal of the beams through the attenuator in the same zone, adoption of the same wavelength for the auxiliary source and suppression of the dichroic mirrors. However, it is postulated in this configuration that the attenuator element is suitable for attenuation measurements at different angles of incidence. By way of example, liquid-crystal attenuators can satisfy this condition and may consequently be employed in this configuration.

One potential application of the device in accordance with the invention lies in the field of optical fiber transmission. It is a desirable objective in this field to attenuate to a predetermined extent a light signal which is received on an input fiber and transmitted by an output fiber.

Figure 7:
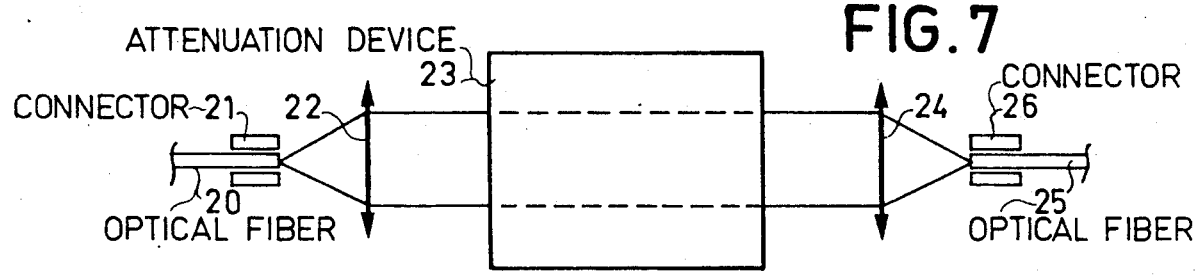
FIG. 7 illustrates an optical fiber transmission circuit.

In this case the device hereinabove described can be inserted in the optical fiber circuit. FIG. 7 shows an arrangement which illustrates this integration.

The input optical fiber 20 is connected to the device by an optical coupling means constituted (as shown by way of example in FIG. 7) by a detachable connector 21 and by a lens 22 which forms a parallel beam from the light issuing from the fiber. This beam passes through the attenuator 23 and is focused by the lens 24 on the output fiber 25 which is attached to the attenuator by means of the connector 26.

Obviously, numerous modifications and variations of the present invention are possible in the light of the above teachings. It is therefore to be understood that within the scope of the apended claims, the invention may be practiced otherwise than as spcifically described herein.

What is claimed is:

1. An optical attenuator system providing controlled attenuation and comprising an attenuator element interposed on the path of a principle light beam, and a control input for adjusting the attenuation, wherein the attenuation produced by the attenuator element is continuously detected by an auxiliary optical system which is optically coupled to said attenuator element, wherein said auxiliary optical comprises an auxiliary light source and means for forming an auxiliary beam and measuring the intensity of said auxiliary beam both upstream and downstream of the attenuator element, and wherein an electronic processing system receives the signals delivered by said auxiliary optical system in order to generate an attenuation control signal.

2. An attenuator system according to claim 1, wherein the beam to be attenuated is parallel.

3. An attenuator system according to claim 1, wherein the light intensities collected before and after attenuation are collected on two photodetectors which deliver measurement signals, said signals being processed by an electronic system and the value of attenuation in decibels being provided directly at the output of said system.

4. An attenuator system according to claim 3, wherein collections of intensity are carried out by means of semitransparent plates.

5. An attenuator system according to claim 1, wherein the light intensity of the auxiliary beam upstream of the attenuator element is measured on a predetermined fraction of said beam, reflected from a semitransparent plate and collected on a photodetector.

6. An attenuator according to claim 1, wherein the auxiliary source is an integrated device element which further comprises a photodetector for determining at each instant the intensity of the auxiliary beam delivered by said element.

7. An attenuator system according to claim 5 or claim 6, wherein the intensity of the auxiliary light beam downstream of the attenuator element is measured by means of a second photodetector.

8. An attenuator system according to claim 5, wherein the photodetectors deliver measurement signals, said signals being processed by an electronic system and the value of attenuation in decibels being provided directly at the output of said system.

9. An attenuator system according to claim 8, wherein the auxiliary beam is parallel.

10. An attenuator system according to claim 9, wherein the principal beam and the auxiliary beam pass through the attenuator element in two separate and distinct regions corresponding to substantially equal attenuations.

11. An attenuator system according to claim 9, wherein the two beams pass through the attenuator element in the same region.

12. An attenuator system according to claim 11, wherein the two beams pass through the attenuator element at different angles of incidence.

13. An attenuator system according to claim 11, wherein the two beams of different wavelengths are superimposed on a limited portion of path which includes the attenuator element, said superimposition being obtained by means of two mirrors which are placed on each side of said attenuator element and at least one of which is dichroic, said mirrors being interposed on the path of the principal beam in order to separate the auxiliary beam from said principal beam after attenuation.

14. An attenuator system according to claim 13, wherein the mirror located upstream of the attenuator element is semitransparent.

15. An attenuator system according to claim 1, wherein said control input of attenuator element is controlled by a comparator which receives a reference value at one input and receives at the other input the value delivered by the signal-processing system.

16. An attenuator system according to claim 1, further comprising an optical coupling means for using said attenuator system in an optical fiber transmission circuit.

* * * * *

UNITED STATES PATENT AND TRADEMARK OFFICE
CERTIFICATE OF CORRECTION

PATENT NO. : 4,378,490

DATED : March 29, 1983

INVENTOR(S) : Luigi D'Auria

It is certified that error appears in the above-identified patent and that said Letters Patent is hereby corrected as shown below:

On the title page

[75] -- Inventor: Luigi D'Auria, Paris, France --

Signed and Sealed this

Twenty-fourth Day of May 1983

[SEAL]

*Attest:*

DONALD J. QUIGG

*Attesting Officer*     *Acting Commissioner of Patents and Trademarks*